United States Patent
Lien et al.

(10) Patent No.: US 12,525,304 B2
(45) Date of Patent: Jan. 13, 2026

(54) RELIABILITY BASED DATA VERIFICATION

(71) Applicant: Micron Technology, Inc., Boise, ID (US)

(72) Inventors: Yu-Chung Lien, San Jose, CA (US); Ankit V. Vashi, San Jose, CA (US); Zhenming Zhou, San Jose, CA (US); Jung Sheng Hoei, Newark, CA (US)

(73) Assignee: Micron Technology, Inc., Boise, ID (US)

( * ) Notice: Subject to any disclaimer, the term of this patent is extended or adjusted under 35 U.S.C. 154(b) by 208 days.

(21) Appl. No.: 17/874,828

(22) Filed: Jul. 27, 2022

(65) Prior Publication Data

US 2024/0038311 A1 Feb. 1, 2024

(51) Int. Cl.
*G11C 16/34* (2006.01)
*G11C 16/08* (2006.01)

(52) U.S. Cl.
CPC .......... *G11C 16/3459* (2013.01); *G11C 16/08* (2013.01); *G11C 16/349* (2013.01)

(58) Field of Classification Search
CPC .... G11C 16/3459; G11C 16/08; G11C 16/349
USPC ........................................................ 711/103
See application file for complete search history.

(56) References Cited

U.S. PATENT DOCUMENTS

| 7,679,133 B2 | 3/2010 | Son et al. |
| 7,808,836 B2 | 10/2010 | Murin et al. |
| 9,899,097 B2 | 2/2018 | Kim et al. |
| 2010/0027336 A1 | 2/2010 | Park et al. |
| 2010/0254193 A1 | 10/2010 | Park et al. |
| 2011/0040924 A1* | 2/2011 | Selinger .............. G06F 11/1004 711/E12.008 |
| 2011/0141818 A1 | 6/2011 | Li |
| 2012/0155183 A1* | 6/2012 | Aritome ................. G11C 16/14 365/185.22 |
| 2013/0028021 A1* | 1/2013 | Sharon ................... G11C 29/04 365/185.17 |
| 2016/0211035 A1* | 7/2016 | Shapira ................. G06F 11/073 |
| 2020/0211663 A1* | 7/2020 | Baraskar ............. G11C 11/5642 |
| 2023/0298667 A1* | 9/2023 | Guo ........................ G11C 16/10 365/185.19 |

* cited by examiner

*Primary Examiner* — Gautam Sain
(74) *Attorney, Agent, or Firm* — Brooks, Cameron & Huebsch, PLLC

(57) ABSTRACT

A method includes designating a first subset of non-volatile memory with a first reliability designation, designating a second subset of non-volatile memory blocks with a second reliability designation, configuring the first subset of non-volatile memory blocks and the second subset of non-volatile memory blocks in a first verification mode, writing data to first subset of non-volatile memory blocks and the second subset of non-volatile memory blocks in the absence of write verification.

15 Claims, 5 Drawing Sheets

RELIABILITY BASED DATA VERIFICATION

TECHNICAL FIELD

Embodiments of the disclosure relate generally to memory sub-systems, and more specifically, relate to reliability based data verification.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
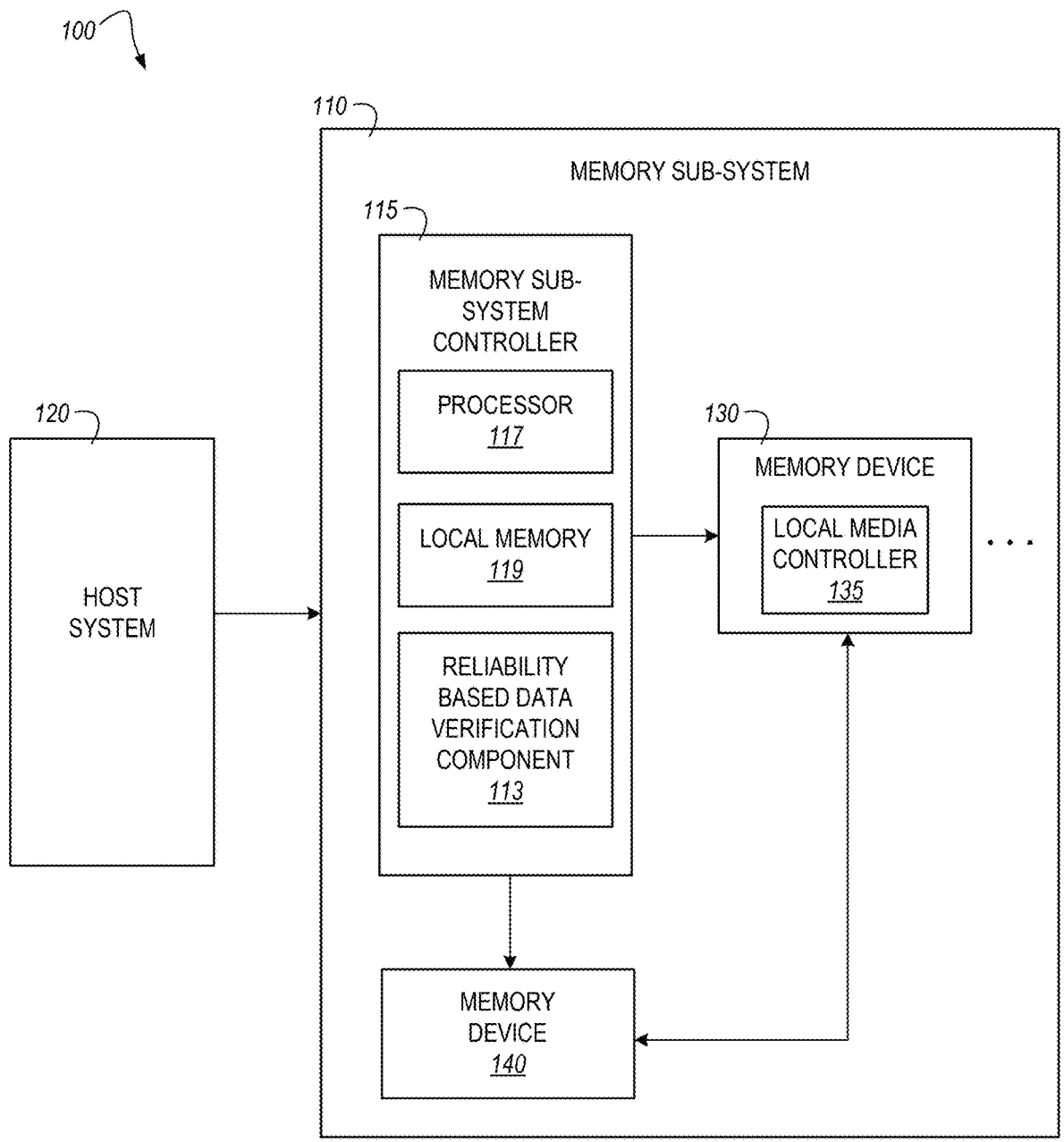
FIG. 1 illustrates an example computing system that includes a memory sub-system in accordance with some embodiments of the disclosure.

Aspects of the present disclosure are directed to reliability based data verification, in particular to memory sub-systems that include a reliability based data verification component. A memory sub-system can be a storage system, storage device, a memory module, or a combination of such. An example of a memory sub-system is a storage system such as a solid-state drive (SSD). Examples of storage devices and memory modules are described below in conjunction with FIG. 1, et alibi. In general, a host system can utilize a memory sub-system that includes one or more components, such as memory devices that store data. The host system can provide data to be stored at the memory sub-system and can request data to be retrieved from the memory sub-system.

A memory device can be a non-volatile memory device. One example of non-volatile memory devices is a negative-and (NAND) memory device (also known as flash technology). Other examples of non-volatile memory devices are described below in conjunction with FIG. 1. A non-volatile memory device is a package of one or more dice. Each die can consist of one or more planes. Planes can be grouped into logic units (LUN). For some types of non-volatile memory devices (e.g., NAND devices), each plane consists of a set of physical blocks. Each block consists of a set of pages. Each page consists of a set of memory cells ("cells"). A cell is an electronic circuit that stores information. A block hereinafter refers to a unit of the memory device used to store data and can include a group of memory cells, a word line group, a word line, or individual memory cells. For some memory devices, blocks (also hereinafter referred to as "memory blocks") are the smallest area that can be erased. Pages cannot be erased individually, and only whole blocks can be erased.

Each of the memory devices can include one or more arrays of memory cells. Depending on the cell type, a cell can be written to in order to store one or more bits of binary information, and has various logic states that correlate to the number of bits being stored. The logic states can be represented by binary values, such as "0" and "1", or combinations of such values. There are various types of cells, such as single-level cells (SLCs), multi-level cells (MLCs), triple level cells (TLCs), and quad-level cells (QLCs). For example, a SLC can store one bit of information and has two logic states.

Some NAND memory devices employ a floating-gate architecture in which memory accesses are controlled based on a relative voltage change between the bit line and the word lines. Other examples of NAND memory devices can employ a replacement-gate architecture that can include the use of word line layouts that can allow for charges corresponding to data values to be trapped (i.e., stored) within memory cells based on properties of the materials used to construct the word lines.

Memory devices can include blocks that are invalid blocks (e.g., bad blocks) and blocks that are valid blocks (e.g., good blocks). As used herein, invalid blocks are blocks that contain one or more invalid bits, and thus whose reliability may not be suitable for retention of data in particular circumstances and/or under particular conditions. Memory devices can be supplied with a table or other data storage mechanism including all the locations (e.g., block addresses) of invalid blocks. Various methodologies such as skipping blocks or reserving blocks exist to mitigate or prevent the use of invalid blocks. Thus, use of the invalid blocks and any errors that would result therefrom can be mitigated or avoided.

As used herein, valid blocks refer to blocks that are invalid bit-free (e.g., do not contain one or more invalid bits) and thus may have a suitable degree of reliability. Yet, a degree of reliability for different valid blocks can vary. For instance, initial reliability testing of valid non-volatile memory blocks of a non-volatile memory device at a point of manufacture or otherwise may indicate differing degrees of reliability of valid blocks. Examples of such reliability testing include raw bit error rate (RBER) testing, among other types of reliability testing.

In some previous approaches, some or all of the valid blocks are subjected to write verification without consideration of a respective reliability characteristic (e.g., RBER) and/or without consideration of a respective health characteristic (e.g., PEC count) of the valid blocks. As used herein, write verification refers to a mechanism to determine whether data has been successfully written to a given block. For instance, write verification can verify an intended data state (e.g., a "1", a "0", etc.), is present in a given block subsequent to a write to the given block(s). For instance, write verification mechanisms can detect "1s" that are not successfully written to "0s", among other possibilities. For example, write verification can be performed responsive to each host write (e.g., responsive to an initial host write, etc.) to the valid blocks.

However, subjecting the valid blocks to write verification responsive to each write to the valid blocks can degrade performance of a memory device. For instance, undergoing write verification may cause a memory device to exhibit longer programming delays and/or higher power consumption as compared to approaches which do not perform write verification. Accordingly, some other approaches may not perform write verification. However, such approaches do not account for the variations in reliability and/or health characteristics of valid blocks, and thus may be prone to errors such as uncorrectable errors.

Thus, due to longer programming delays, higher power consumption, and/or being prone to errors, the above approaches can degrade performance of a memory sub-system. Degradation of performance can be undesirable, especially in critical applications and/or in demanding applications in which very high memory sub-system performance is expected. Further, this degraded performance that can be exhibited in such approaches can be further exacerbated in mobile (e.g., smartphone, internet of things, etc.) memory deployments in which an amount of space available to house a memory sub-system is limited in comparison to traditional computing architectures.

Aspects of the present disclosure address the above and other deficiencies by employing reliability based data verification. For instance, a first subset of non-volatile memory blocks can be designated with a first reliability designation based on a reliability characteristic of at least one non-volatile memory block of the first subset of non-volatile memory blocks and a second subset of non-volatile memory blocks can be designated with a second reliability designation based on a reliability characteristic of at least one non-volatile memory block of the second subset of non-volatile memory blocks.

Notably, data can be written to the first subset of the non-volatile memory blocks and/or the second subset of non-volatile memory blocks in a first verification mode (in the absence of write verification of the data). Thus, when configured in the first verification mode data can be written with a quantity of programming passes (e.g., one programming pass) in the absence of write verification (without any write verification of the data). For instance, the first verification mode can be a verification mode which does not employ write verification such as a 1P0V verification mode. As used herein, a 1P0V verification mode refers to verification mode the employs an individual programming operation (e.g., including one or more programming passes) to write an instance of data corresponding to an memory operation (e.g., an individual write operation) to a memory and has an absence of write verification (e.g., performs zero write verification operations on the data). For instance, the 1P0V verification mode can be employed to write data via an individual programming operation to a SLC memory blocks. Embodiments herein operating in the first verification mode can write data in the absence of write verification for at least an initial period of time following initial operation of a memory device (e.g., initial operation with a host). Thus, embodiments herein avoid incurring the longer programming times and/or higher power consumption associated with other approaches such as those that always perform write verification of data.

Yet, due to characteristics inherent in NAND memory devices, data quality can degrade over time. Health characteristics, as detailed herein, can indicate a degree of wear of a block of memory cells. For instance, a health characteristic can be a program-erase cycle (PEC) count of a block of memory cells, among other possible health characteristics. A "PEC count" generally refers to the number of times a NAND block has been accessed (e.g., programmed and/or erased). As the PEC count of a block increases, data quality in the block can decrease. In some instances, the PEC count can be a PEC count of a physical block of memory cells. As used herein, a "physical block of memory cells" or "physical block" generally refers to a set of memory cells that store charges corresponding to data values and has an address (e.g., a physical block address) associated therewith. Degradation of data quality can render blocks prone to failures such as causing a read operation performed on a memory cell in the block to fail or return a corrupted/incorrect data value.

Accordingly, embodiments herein can account for reliability characteristics and health characteristic values to determine whether or not to employ write verification, and thus can realize improved performance as compared to other approaches. For instance, as mentioned herein, embodiments of the present disclosure can designate subsets of non-volatile memory blocks with a given reliability designation. Subsequently, embodiments described herein can write data to a subset of non-volatile memory blocks, determine a respective health characteristic (e.g., a PEC count) associated with non-volatile memory blocks in the subset, determine at least one respective health characteristics exceeds a health threshold, and can operate the subset in accordance with a second verification mode. When configured in the second verification mode, data written to the non-volatile memory blocks of the subset can undergo write verification. The write verification can mitigate any errors that may otherwise occur, for instance, due to the non-volatile memory blocks aging. Thus, due to accounting for differing reliability characteristics and health characteristics of non-volatile memory blocks, embodiments herein can exhibit improved reliability (e.g., incur fewer errors), compared to other approaches such as those that do not selectively perform write verification, thereby improving the overall performance of a computing system or computing device in which aspects of the disclosure operate.

In some embodiments, aspects of the disclosure described herein can be employed with single level memory cell blocks and/or higher level non-volatile memory blocks configured to operate in a single-level mode (e.g., configured to store one bit of information per memory cell). For instance, embodiments described herein can be employed with SLC memory blocks. However, embodiments herein can be employed with higher level non-volatile memory blocks (e.g., TLC memory blocks capable of storing 3 bits of information per memory cell, etc.) which, when configured in a single-level mode, are configured to only store one bit of information per memory cell.

FIG. 1 illustrates an example computing system 100 that includes a memory sub-system 110 in accordance with some embodiments of the disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, server, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., an SSD controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130, 140 can include one or more arrays of memory cells. One type of memory cell, for example, single-level cells (SLC) can store one bit per cell. Other types of memory cells, such as multi-level cells (MLCs), triple level cells (TLCs), quad-level cells (QLCs), and penta-level cells (PLC) can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, a MLC portion, a TLC portion, a QLC portion, and/or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as three-dimensional cross-point arrays of non-volatile memory cells and NAND type memory (e.g., 2D NAND, 3D NAND) are described, the memory device 130 can be based on any other type of non-volatile memory or storage device, such as such as, read-only memory (ROM), phase change memory (PCM), self-selecting memory, other chalcogenide based memories, ferroelectric transistor random access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

As described above, the memory components can be memory dice or memory packages that form at least a portion of the memory device 130. In some embodiments, the blocks of memory cells can form one or more "superblocks." As used herein, a "superblock" generally refers to a set of data blocks that span multiple memory dice and are written in an interleaved fashion. For instance, in some embodiments each of a number of interleaved NAND blocks can be deployed across multiple memory dice that have multiple planes and/or pages associated therewith. The terms "superblock," "block," "block of memory cells," and/or "interleaved NAND blocks," as well as variants thereof, can, given the context of the disclosure, be used interchangeably.

The memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can be a processor 117 (e.g., a processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory device 130 and/or the memory device 140. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address, physical media locations, etc.) that are associated with the memory devices 130. The memory sub-system controller 115 can further include host interface circuitry to communicate with the host system 120 via the physical host interface. The host interface circuitry can convert the commands received from the host system into command instructions to access the memory device 130 and/or the memory device 140 as well as convert responses associated with the memory device 130 and/or the memory device 140 into information for the host system 120.

In some embodiments, the memory sub-system 110 can include a cache or buffer (e.g., DRAM) and address circuitry (e.g., a row decoder and a column decoder) that can receive an address from the memory sub-system controller 115 and decode the address to access the memory device 130 and/or the memory device 140. For instance, in some examples, the memory device 140 can be a DRAM and/or SRAM configured to operate as a cache for the memory device 130. In such instances, the memory device 130 can be a NAND.

In some embodiments, the memory device 130 includes local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local media controller 135) for media management within the same memory device package. An example of a managed memory device is a managed NAND (MNAND) device. The memory sub-system 110 can also include additional circuitry or components that are not illustrated.

The memory sub-system 110 can include a reliability based data verification component 113. Although not shown in FIG. 1 so as to not obfuscate the drawings, the reliability based data verification component 113 can include various circuitry to facilitate aspects of media management, as detailed herein. In some embodiments, the reliability based data verification component 113 can include special purpose circuitry in the form of an ASIC, FPGA, state machine, and/or other logic circuitry that can allow the reliability based data verification component 113 to orchestrate and/or perform the operations described herein.

In some embodiments, the memory sub-system controller 115 includes at least a portion of the reliability based data verification component 113. For example, the memory sub-system controller 115 can include a processor 117 (processing device) configured to execute instructions stored in local memory 119 for performing the operations described herein. In some embodiments, the reliability based data verification component 113 is part of the memory sub-system 110, an application, or an operating system.

In a non-limiting example, an apparatus (e.g., the computing system 100) can include a reliability based data verification component 113. The reliability based data verification component 113 can be resident on the memory sub-system 110. As used herein, the term "resident on" refers to something that is physically located on a particular component. For example, the reliability based data verification component 113 being "resident on" the memory sub-system 110 refers to a condition in which the hardware circuitry that comprises the reliability based data verification component 113 is physically located on the memory sub-system 110. The term "resident on" can be used interchangeably with other terms such as "deployed on" or "located on," herein.

The reliability based data verification component 113 can be configured to designate a first subset of non-volatile memory blocks of a non-volatile memory with a first reliability designation based on a reliability characteristic of at least one non-volatile memory block of the first subset of non-volatile memory blocks, designate a second subset of non-volatile memory blocks of the non-volatile memory with a second reliability designation based on a reliability characteristic of at least one non-volatile memory block of the second subset of non-volatile memory blocks, and configure the first subset of non-volatile memory blocks and the second subset of non-volatile memory blocks in a first verification mode. In some embodiments, the reliability based data verification component 113 can write data to the first subset of non-volatile memory blocks in the absence of write verification of the data or the second subset of non-volatile memory blocks in the absence of write verification of the data. For instance, embodiments herein can, for at least a period of time (e.g., a period of time following an initial operation of a memory device), write data associated write operations to each subset of non-volatile memory cells in the absence of write verification.

In some embodiments, a first subset of non-volatile memory blocks to operate in the first verification mode prior to writing any host data to the non-volatile memory. In some embodiments, each subset of non-volatile memory blocks (e.g., each word line group) can be given a given reliability designation and can be configured to operate in a first verification mode prior to writing any host data to the non-volatile memory. For instance, embodiments herein can at least initially write data to each subset of non-volatile memory cells such as each word line group in a memory device in the absence of write verification. As used herein, a word line group refers to a group of non-volatile memory cells that each share a common (e.g., individual) line which can be employed to access and perform memory operations on or using any one of the word line group. Thus, as mentioned embodiments herein can have reduced programming delay and/or have reduced power consumption, as compared to other approaches.

For example, a word line group can have a first reliability designation that designates word line group as being reliability prone (e.g., based on initial reliability testing). That is, at least one non-volatile memory block in the word line group can have a reliability characteristic that satisfies (e.g., meets or exceeds) a reliability threshold or "reliability criteria." In such instances, the word line group (e.g., a reliability prone word line group) can initially be configured in a first verification mode (e.g., a 1P0V verification mode). In this manner, data can be written to non-volatile memory blocks in the reliability prone word line group in the absence of write verification.

However, subsequent to the data being written to the reliability prone word line group, health characteristics of the non-volatile memory cells in the reliability prone word line group can be determined. For instance, respective PEC counts of each non-volatile memory block in the word line group can be determined subsequent to a memory operation (e.g., read operation, write operation, and/or erase operation) involving the reliability prone word line group. The respective health characteristic values can be compared to a health threshold (e.g., a PEC threshold). Responsive to a determination that at least one of the health characteristic values satisfies (e.g., meets or exceeds) a health threshold, the reliability prone word line group can be configured to operate in a second verification mode. Thus, any subsequent write operations which write data to the reliability prone word line group can undergo write verification of the data. As mentioned, write verification can mitigate or avoid incurring any errors that may otherwise be incurred, for instance, as the non-volatile memory blocks of the reliability prone word line group age.

Yet, responsive to a determination that the health characteristic values (e.g., each health characteristic values) of the non-volatile memory blocks of the reliability prone word line group do not satisfy a health threshold, the reliability prone word line group can remain configured in the first verification mode. Data (e.g., from additional write operations) can therefore continue to be written to the reliability prone word line group in the absence of verification.

Moreover, other subsets and/or other word line groups which are not reliability prone can be designated with a different reliability designation such as a second reliability designation. Accordingly, data can be written to the other subsets and/or other word line groups in the absence of write verification, for instance at least until an endurance threshold is satisfied.

As such, embodiments herein can selectively configure subsets of non-volatile memory blocks (e.g., word line groups) to employ write verification only when warranted based on reliability characteristics and health characteristics. Thus, as mentioned embodiments herein exhibit shorter programming delays, lower power consumption, and/or are less prone to errors, compared to the other approaches described herein.

Figure 2A:
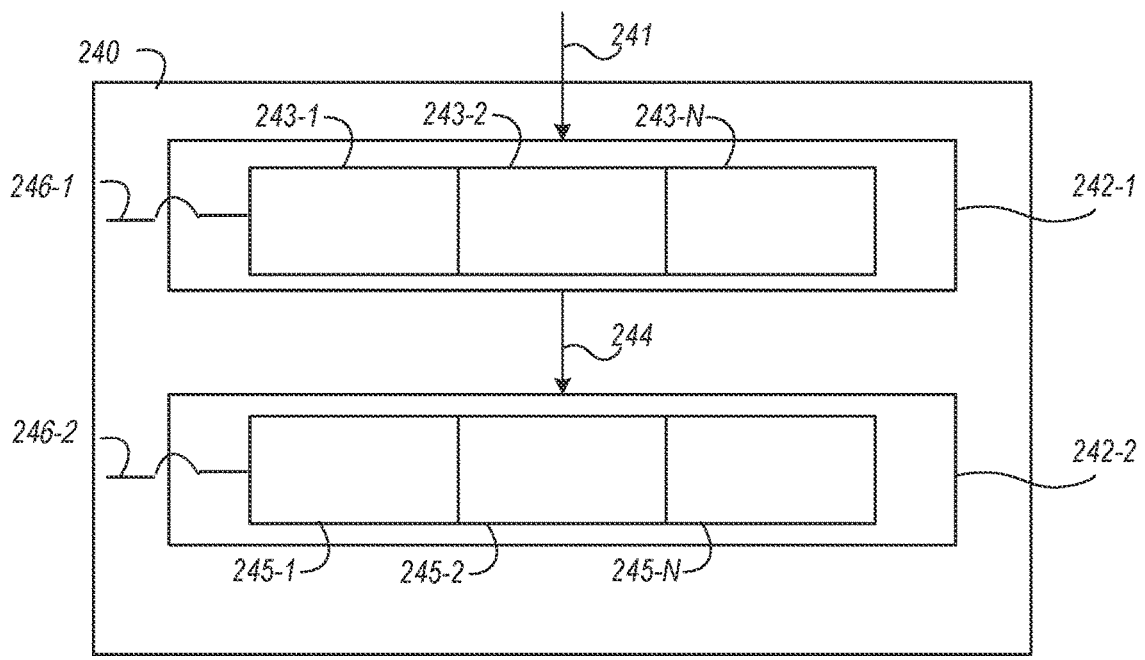
FIG. 2A illustrates an example diagram of a non-volatile memory device for reliability based data verification in accordance with some embodiments of the disclosure.

FIG. 2A illustrates an example diagram of a non-volatile memory device 240 for reliability based data verification in accordance with some embodiments of the disclosure. The diagram of FIG. 2A illustrates aspects of performing reliability based data verification for a memory sub-system having blocks of memory cells such as the memory sub-system 110.

Non-volatile memory device 240 can be non-volatile memory. As used herein, a non-volatile memory refers to a device having blocks of non-volatile memory cells which are configured to store at least 1 bit per memory cell. The non-volatile memory blocks or blocks of non-volatile memory cells (243-1, 243-1, . . . , 243-N and 245-1, 245-2, . . . , 245-N; collectively referred to herein as blocks 243, 245) in the non-volatile memory device 240 can include blocks of non-volatile SLCs, MLCs, TLCs, QLCs, and/or PLCs, among other possibilities. As illustrated in FIG. 2A the first subset of non-volatile memory blocks (or the first subset) 242-1 can be formed of a first word line group 246-2 of the blocks 243-1, 243-2, . . . , 243-N, whereas the second subset 242-2 can be formed of a second world line group 246-2 of the non-volatile memory blocks 245-1, 245-2, . . . , 245-N. That is, in some embodiments the first subset 242-1 and the second subset 242-2 can correspond to different word line groups 246-1, 246-2, respectively.

For instance, the blocks 243, 245 in the non-volatile memory device 240 can include blocks of SLCs that can store one bit of information and/or can include higher level blocks on non-volatile memory configured to store one bit of information, among other possibilities. In some embodiments, the blocks 243, 245 can include only SLCs and/or only higher level blocks configured as SLCs. As used herein a SLC refers to a memory cell that can store only 1 bit of information per memory cell.

A first subset 242-1 of the non-volatile memory device 240 can be selectively configured to operate in a first reliability mode, as detailed herein. For instance, a free non-volatile memory block of the non-volatile memory device 240 can be selectively configured to operate in the first reliability mode, among other possibilities. A "free block" (e.g., an open virtual block, physical block, and/or logical block) generally refers to a memory block where pages of the memory block are free of data (not programmed). The free non-volatile memory block (i.e., a free block) can be included in a free block pool including free blocks. Use of a free block can promote rapid configuration of the free block to operate in a given verification mode (e.g., a first verification mode) as compared to use of other blocks having data stored therein.

However, in some embodiments, blocks having data stored therein can be configured to a given verification mode. For instance, a block having data stored therein and configured to operate in a first verification mode (e.g., 1P0V) can be configured to operate in a different verification mode such as a second verification mode. For instance, the second verification mode can be a 1P1V verification mode. As used herein, a 1P1V verification mode refers to a verification mode that employs one programming operation to write data to a memory block and one subsequent write verification operation of the data written to the memory block. For instance, a block can be configured into the 1P1V verification mode responsive to a health characteristic (e.g., a PEC count) of the block satisfying a health threshold (e.g., a PEC threshold).

A controller can selectively configure a subset of the non-volatile memory block with a given reliability designation and/or to operate in a given verification mode. For instance, a controller can designate a first subset of the non-volatile memory blocks with a first reliability designation or a second reliability designation, among other possibilities. Similarly, a controller can configure a first subset of the non-volatile memory blocks in a first verification mode or a second verification mode, among other possibilities. Configuration of the blocks into a given verification mode and/or with a given reliability designation can be performed by a memory sub-system controller or otherwise. For instance, the memory sub-system controller can change a setting or value associated with a given memory block and/or group of memory blocks (e.g., a word line group) to alter operation of the memory block and/or group of memory blocks from operation in a first verification mode to operation in a second verification mode. An indicator of a current reliability designation and/or a current verification mode (e.g., a first verification mode or a second verification mode) such as a value or other indicator can be stored in a table such as a look-up table or is otherwise stored or accessible to the memory sub-system.

As mentioned, a first subset 242-1 of the blocks 243, 245 be designated with a first reliability designation. In some embodiments, the first reliability designation (e.g., corresponding to a first value such as a "0" in a look-up table or otherwise stored and accessible to a host and/or controller) can indicate the first subset 242-1 is reliability prone. The first subset 242-1 of the blocks 243, 245 can be configured to operate in (or remain configured in accordance with) a first verification mode such as a 1P0V verification mode. The first subset 242-1 can remain configured in the first verification mode until a health characteristic value of at least one of the blocks 243 in the first subset 242-1 satisfies (e.g., meets or exceeds) a health threshold. For instance, a PEC count of at least one of the blocks 243 can satisfy a given PEC threshold.

Conversely, a second subset 242-2 of the blocks 243, 254 can be designated with a second reliability designation. In some embodiments, the second reliability designation (e.g., corresponding to a second value such as a "1" in a look-up table or otherwise stored and accessible to a host and/or controller) can indicate that the second subset 242-2 is not reliability prone. The second subset 242-2 of the blocks 243, 245 can be configured in (or remain configured in) a first verification mode such as a 1P0V verification mode. The second subset 242-2 can be configured in (or remain configured in) the first verification mode at least until an endurance threshold. The endurance threshold can be based on or equal to an expected operational lifetime of the non-volatile memory device. The endurance threshold can be based on an expected PEC count at which the blocks 243, 245 are expected to not function as intended (e.g., no longer store data with a given degree of reliability), as is conventionally known. For instance, the endurance threshold can correspond to a given PEC count that is higher than a given PEC count of the health threshold, as detailed herein with respect to FIG. 2B.

Data can be written to the first subset 242-1 and the second subset 242-2. For instance, data (as represented by element identifier 241) can be written to the first subset of memory blocks 242-1 that are configured to operate in the first verification mode in the absence of write verification, as detailed. Similarly, data (as represented by element identifier 244) can be written to the second subset 242-2 configured in the first verification mode in the absence of write verification, as detailed herein.

While FIG. 2A illustrates the first subset 242-1, the second subset 242-2, the first word line group 246-2, and the second word line group 246-2 as including a given quantity of memory blocks, the quantity in memory blocks in the first subset 242-1, the second subset 242-2, the first word line group 246-2, and the second word line group 246-2 can be varied. A sum of a first quantity of the first subset of non-volatile memory blocks and the second quantity of the second subset of non-volatile memory blocks can be equal to a total block count of the non-volatile memory (e.g., a total quantity of blocks omitting blocks which are over-provisioned). In some embodiments, each word line group can have a respective reliability designation and can be configured to operate in a respective verification mode.

Figure 2B:
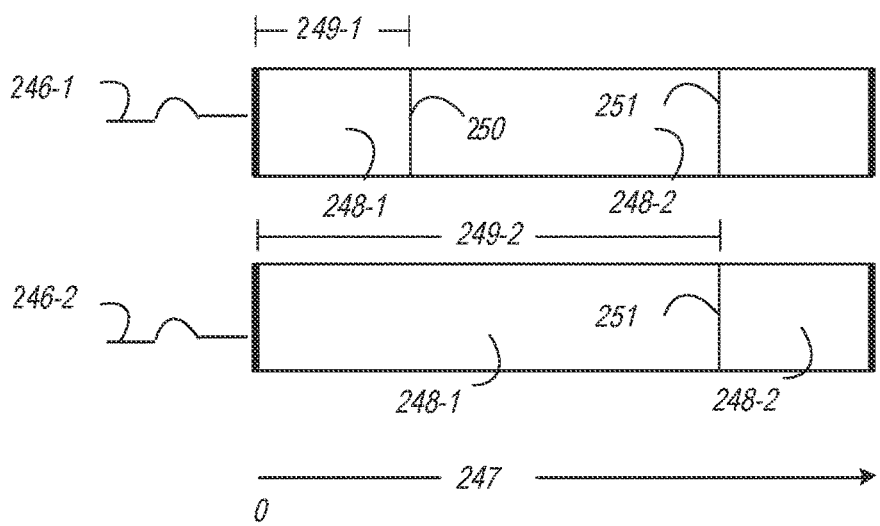
FIG. 2B illustrates an example diagram for reliability based data verification in accordance with some embodiments of the disclosure.

FIG. 2B illustrates an example diagram for reliability based data verification in accordance with some embodiments of the disclosure. As illustrated in FIG. 2B, the first word line group 246-1 and the second word line group 246-2 can each be initially configured in a given verification mode such as a first verification mode, as represented by element 248-1. The first verification mode can be a 1P0V verification mode or other verification mode which permits data to be written in the absence of data verification.

For example, data can be written to the first word line group 246-1 configured in the first verification mode for a first duration of time and/or quantity of PEC counts 249-1 until a health threshold 250 is satisfied. As mentioned, as the PEC count of a block increases, data quality in the block can decrease. A quantity of PEC counts over time is represented by the axis 247. For instance, the PEC count of the blocks in the first word line group 246-1 may be (e.g., initially be) less than the health threshold. Thus, even a reliability prone word group such as the first word line group 246-1 (e.g., having a first reliability designation) can operate in the absence of write verification for a duration of time, in contrast to other approaches that perform write verification even on non-reliability prone subsets of non-volatile memory blocks and/or on non-volatile memory blocks that may be reliability prone but have satisfactory health characteristics such as a relatively low PEC count.

However, responsive to a determination that at least one of the non-volatile memory blocks included in the first word line group 246-1 satisfies the health threshold 250, the first word line group 246-1 can be configured in a second verification mode, as represented by 248-2. For instance, a PEC count of at least one non-volatile memory block in the first word line group 246-1 can be equal to or greater than the health threshold 250 (e.g., 2,000 PEC counts, 300 PEC counts, etc.). Accordingly, write verification can be performed on additional data written to the first word line group 246-1. Stated differently, once a health characteristic value of a non-volatile memory block in a reliability prone word line group satisfies a health threshold, any subsequent data written to the reliability prone word line group can undergo write verification. The write verification can ensure the reliability of the data. For instance, any additional data written to the first word line group 246-1 (subsequent to a health characteristic of at least one of non-volatile memory blocks in the first word line group exceeding the health threshold 250) can undergo data verification until and/or past the endurance threshold 251.

Conversely, data can be written to other word line groups that are not reliability prone can be written in the absence of the write verification for an entire expected operational lifetime of the other word line groups. For instance, data can be written to the second word line group 246-2 for a second duration of time and/or quantity of PEC counts 249-2 in the absence of write verification at least until an endurance threshold is satisfied. In some embodiments, data can be written to the second word line group 246-2 in the absence (without) write verification of the data until the endurance threshold is satisfied (e.g., an endurance criterion is met or exceeded). In such instances, responsive to a determination that at least one non-volatile memory block in the second word line group satisfies the endurance threshold the second world line group 246-2 can be configured in the second verification mode. Thus, any additional data written to the second word line group 246-2 can undergo write verification subsequent to at least one of the non-volatile memory blocks in the second word line group 246-2 exceeding the endurance threshold 251. Notably, configuring different subsets of non-volatile memory blocks (e.g., different word line groups) in a memory sub-system with different verification modes based on a reliability designation and a health characteristic yields less programming delays, reduces power consumption, and/or yields improved reliability (e.g., with less errors) than other approaches such as those described herein.

Figure 3:
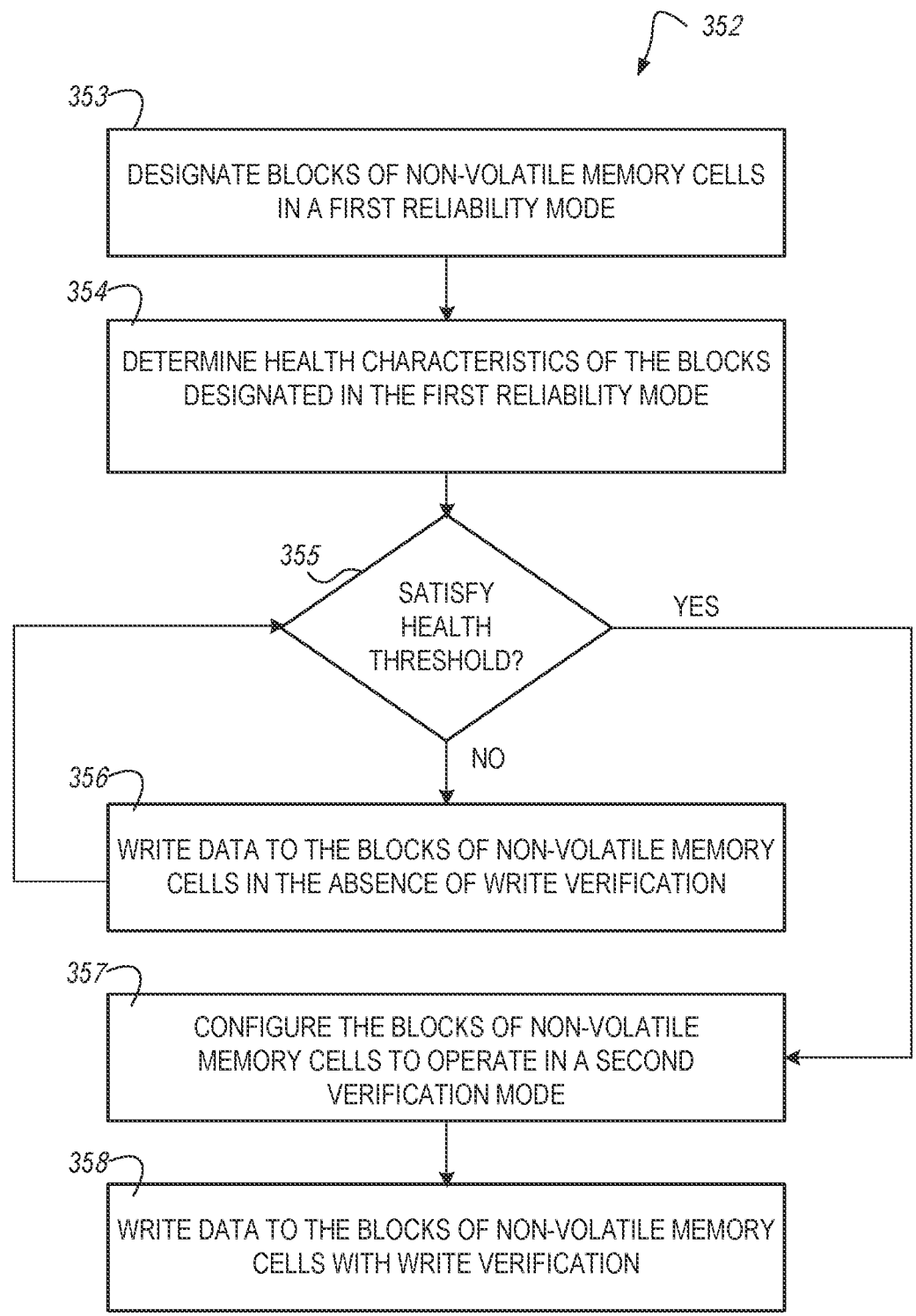
FIG. 3 illustrates a flow diagram for reliability based data verification in accordance with some embodiments of the disclosure.

FIG. 3 illustrates a flow diagram 352 for reliability based data verification in accordance with some embodiments of the disclosure. At 353, a subset of blocks of non-volatile memory cells can be configured in a first reliability mode. The determination whether to configure a given subset in a given reliability mode (e.g., the first reliability mode) can be based on reliability testing, as detailed herein. For instance, reliability testing can indicate that a given subset of non-volatile memory blocks such as a given word line group is reliability prone. In such instances, the reliability prone subset of non-volatile memory blocks can be designated with a given designation such as first reliability designation that is indicative (e.g., to a host, a controller, etc.) that the subset is reliability prone. For instance, an indication can be made based on a setting, a flag, etc. associated with or included in a controller such as the memory sub-system controller, among other possibilities.

Data can be written to at least one subset of non-volatile memory blocks. For instance, data associated with performance of a memory operation (e.g., a host write operation) can be written a first subset of non-volatile memory blocks (e.g., a first word line group). In some embodiments, an entire non-volatile memory can be configured to operate, at least initially, in a first write verification mode in the absence of write verification. As mentioned, such operation can permit the effective and efficient storage of data, in contrast to other approaches such as those employ write verification without accounting for a reliability characteristic and a health characteristic of various subsets of non-volatile memory blocks in the non-volatile memory.

Configuration of the blocks into a given verification and/or designation of the blocks with a given reliability designation can be performed by a memory sub-system controller or otherwise. For instance, the memory sub-system controller can change a setting or value associated with a given memory block to alter operation of the memory block from operation in a first verification mode to a second verification mode. The indicator of a current operation mode (e.g., a first verification mode and/or a first reliability designation) such as a value or other indicator can be stored in a table such as a look-up table or is otherwise stored or accessible to the memory sub-system.

Subsequent to the data being written to at least one subset of non-volatile memory blocks, respective health characteristics of at least one subset of non-volatile memory blocks can be determined. In some embodiments, responsive to a memory operation (e.g., a write operation) involving a subset of non-volatile memory blocks a respective health characteristic of at least one non-volatile memory block in the subset can be determined. For instance, a respective PEC count of at least one non-volatile memory block in the first subset can be determined. In some embodiments, responsive to a memory operation (e.g., a write operation) involving a subset of non-volatile memory blocks a respective health characteristics of each non-volatile memory block in the subset can be determined. For instance, a respective PEC count each non-volatile memory block in the first subset can be determined responsive to a memory operation involving the first subset of non-volatile memory blocks.

For example, at 354 health characteristics of each of the non-volatile memory blocks in a first subset designated with a first reliability designation can be determined responsive to a memory operation involving the first subset. In some embodiments, responsive to a memory operation (e.g., a write operation) involving a subset of non-volatile memory blocks a respective health characteristic each non-volatile memory block in each of the subsets can be determined.

At 355, a respective health characteristic of at least one non-volatile memory block can be compared to health threshold to determine if the health threshold (or criteria) is satisfied. For instance, the respective health characteristic can be a respective PEC count that can be compared to a heath threshold. As mentioned, the health threshold can be equal to a given quantity of PEC counts, among other possibilities.

The health threshold can be determined to not be satisfied responsive to a determination that each respective health characteristic of each non-volatile memory block in a given subset of non-volatile memory blocks does not satisfy than the health threshold (e.g., the same health threshold). For instance, the health threshold is not satisfied responsive to a determination that each respective health characteristic of each non-volatile memory block in a given subset of non-volatile memory blocks is less than the health threshold. However, in some embodiments, the health threshold can be determined to not be satisfied responsive to a determination that less than a threshold quantity (e.g., two blocks, three blocks, etc.) of the non-volatile memory blocks in a subset satisfy the health threshold.

Responsive to a determination that the health threshold is not satisfied, the flow can proceed to 356. At 356, data can be written to the given subset of non-volatile memory blocks in the absence of write verification. Responsive to the data be written to the given subset of non-volatile memory blocks, the flow can return to 355.

Conversely, the health threshold can be satisfied responsive to a determination that a respective health characteristic of at least one non-volatile memory block in a given subset of non-volatile memory blocks exceeds the health threshold. For instance, the health threshold can be exceeded responsive to a determination that a respective health characteristic of at least one non-volatile memory block meets (is equal to) or exceeds the health threshold. However, in some embodiments, the health threshold can be determined to be satisfied responsive to a determination that greater than or equal to a threshold quantity (e.g., two blocks, three blocks, etc.) of the non-volatile memory blocks in a subset satisfy the health threshold.

Responsive to a determination that the health threshold is satisfied, the flow can proceed to 357. At 357, the given subset of non-volatile memory (e.g., a first subset of non-volatile memory cells) such as given word line group can be configured in a second verification mode. Subsequent to configuring the given subset of non-volatile memory in the second verification mode, the flow can proceed to 358. At 358, data can be written to the given subset of non-volatile memory (e.g., a first subset of non-volatile memory cells).

For instance, data can be written to at least one non-volatile memory block included in the subset of non-volatile memory blocks with write verification, as detailed herein. In this manner, any additional data written to the given subset of non-volatile memory blocks once configured in the second verification mode can be written with write verification.

Figure 4:
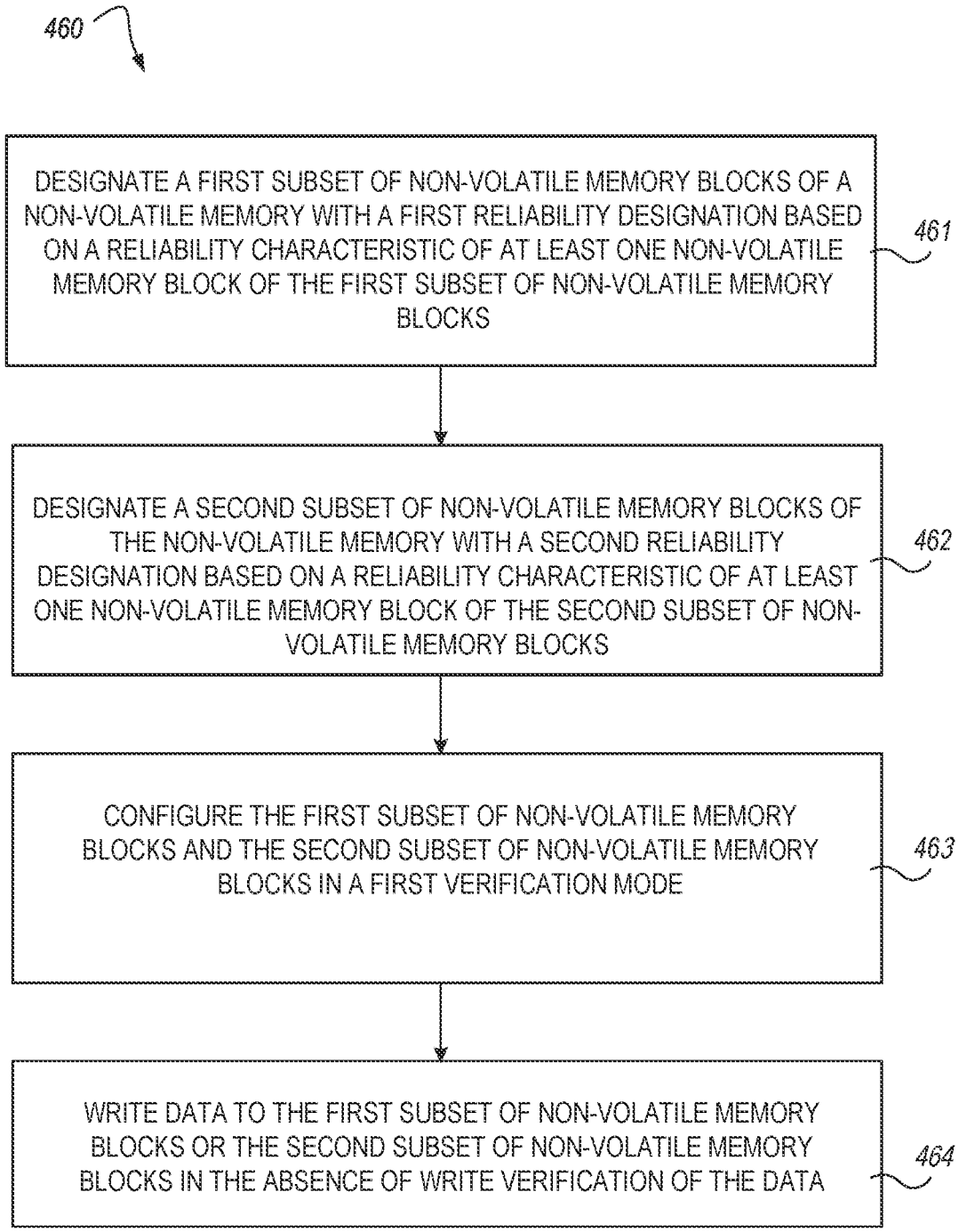
FIG. 4 is a flow diagram corresponding to a method for reliability based data verification in accordance with some embodiments of the disclosure.

FIG. 4 is a flow diagram corresponding to a method 460 for reliability based data verification in accordance with some embodiments of the disclosure. The method 460 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 460 is performed by the reliability based data verification component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

In various embodiments, a portion (e.g., a word line group of non-volatile memory cells sharing an individual word line) of the non-volatile memory can designated with a given reliability designation (e.g., a first reliability designation, etc.) and can be configured to operate in a particular verification mode (e.g., a first verification mode, etc.). The portion can be designated with a given reliability designation based on reliability testing of the portion of the non-volatile memory and/or can be configured in a given verification mode based on heath characteristics of the portion of the non-volatile memory. That is, the portion of the non-volatile memory can be configured to operate in a particular verification mode (e.g., a first verification mode, a second verification mode, etc.) based on a reliability designation and a health characteristic of the portion, as detailed herein. For instance, a portion of the non-volatile memory such as a given word line group can be designated with a first reliability designation and can be configured to operate in a first verification mode, as detailed herein.

At 461, at least a first subset of non-volatile memory blocks (e.g., a word line group) of a non-volatile memory can be designated with a first reliability designation based on a reliability characteristic of at least one non-volatile memory block of the first subset of non-volatile memory blocks, as detailed herein. Similarly, at 462 a second subset of non-volatile memory blocks of the non-volatile memory can be designated with a second reliability designation based on a reliability characteristic of at least one non-volatile memory block of the second subset of non-volatile memory blocks, as detailed herein.

In some embodiments, each subset of non-volatile memory blocks in the non-volatile memory is designated with a respective reliability designation. As mentioned, the initial reliability testing (e.g., a point of manufacture of a non-volatile memory device) can provide an expectation of how long (e.g., for an expected quantity of PEC counts) the non-volatile memory device will function as intended (e.g., permit data to be read/written successfully). Various reliability tests can be employed. Examples of suitable reliability tests include JEDEC Data Retention Tests (e.g., JEDEC JESD47, etc.). As mentioned, the reliability test can be employed on non-volatile memory cells and/or groups of non-volatile memory cells such as word line groups.

Respective non-volatile memory cells and/or respective subsets of memory cells such as respective world lines can have a given reliability characteristic associated therewith. For instance, a given world line group of non-volatile memory cells sharing the same word line can have a respective reliability characteristic associated therewith, as detailed herein. Embodiments herein permit reliability-prone subsets of non-volatile memory cells such as a reliability-prone word lines that have a permissible amount of reliability risk to operate for a period of time and/or quantity of PEC cycles in a first reliability mode (e.g., 1P0V). Thus, data can be written to the subset of non-volatile memory cells in the absence of write verification at least initially. For instance, a subset of non-volatile memory cells such as a world line group can be configured to operate in a first reliability mode responsive to a determination that the subset has at least one reliability characteristic that satisfies (e.g., exceeds) a reliability threshold, but does not have at least one health threshold that satisfies (e.g., exceeds) a health threshold. Thus, embodiments herein realize improved memory subs-system performance, as compared to other approaches such as those that always perform write verification or never perform write verification, as detailed herein.

In some embodiments, the subset of non-volatile memory cells that satisfies the reliability threshold but does not satisfy the health threshold can be designated as a reliability prone group and yet can continue to operate in the first reliability mode until an occurrence of an event. Occurrence of an event can be determined based on a change in a health characteristic (e.g., a PEC count) associated with the subset of non-volatile memory cells. For instance, a health characteristic of at least one block in the subset of non-volatile memory blocks can change over an operational lifetime of a memory sub-system. Eventually, the health characteristic value may exceed a health threshold resulting in an occurrence of an event.

For example, a PEC count of a block of non-volatile memory cells can be incremented. The incremented PEC count can be compared to a health threshold (e.g., a given quantity of PEC counts). An occurrence of an event can be determined responsive to the incremented PEC count satisfying (e.g., exceeding) the health threshold. In response, the subset of non-volatile memory blocks configured to operate in the first reliability mode can be configured to operate in the second reliability mode (e.g., 1P1V). Thus, any subsequent writes associated with (e.g., addressed to) the subset of non-volatile memory blocks can undergo write verification to ensure data is successfully written to the reliability prone subset of non-volatile memory blocks. At 463, the first subset of non-volatile memory blocks and the second subset of non-volatile memory blocks can be configured in a first verification mode, as detailed herein.

At 464, data can be written to the first subset of non-volatile memory blocks in the absence of write verification of the data or the second subset of non-volatile memory blocks in the absence of write verification of the data, as detailed herein. Writing the data to at least one non-volatile memory block included in a subset such as the first subset of non-volatile memory blocks in the absence write verification can yield improved memory sub-system performance. For instance, an amount of write verification and corresponding performance degradation can be reduced, as compared to other approaches described herein. For example, embodiments herein can realize reduced (e.g., 22 percent reduction) typical page programming time (tPROG) and/or a reduced (e.g., 22 percent reduction) power consumption (e.g., via a reduction in the average current experienced by circuit components comprising the memory blocks, such as an Icc or other metric used to measure charge/current flow in memory components) associated with array operations (program, read, erase), as compared to other approaches.

Yet, embodiments herein can selectively perform write verification of data based on reliability characteristics and/or health characteristics, and thus yield improved data reliability as compared to other approaches such as those that do not utilize write verification. For instance, a group of non-volatile memory cells such as a word line group that satisfies (e.g., exceeds) as reliability threshold and/or satisfies (e.g., exceeds) a heath threshold can be configured to operate in accordance with the second reliability mode. Accordingly, write verification can be performed on data written to the group of non-volatile memory cells configured to operate in the second reliability mode. As such, embodiments herein can account for differences in reliability characteristics and/or health characteristics of groups of non-volatile memory cells to realize improved performance such as improved data reliability.

Figure 5:
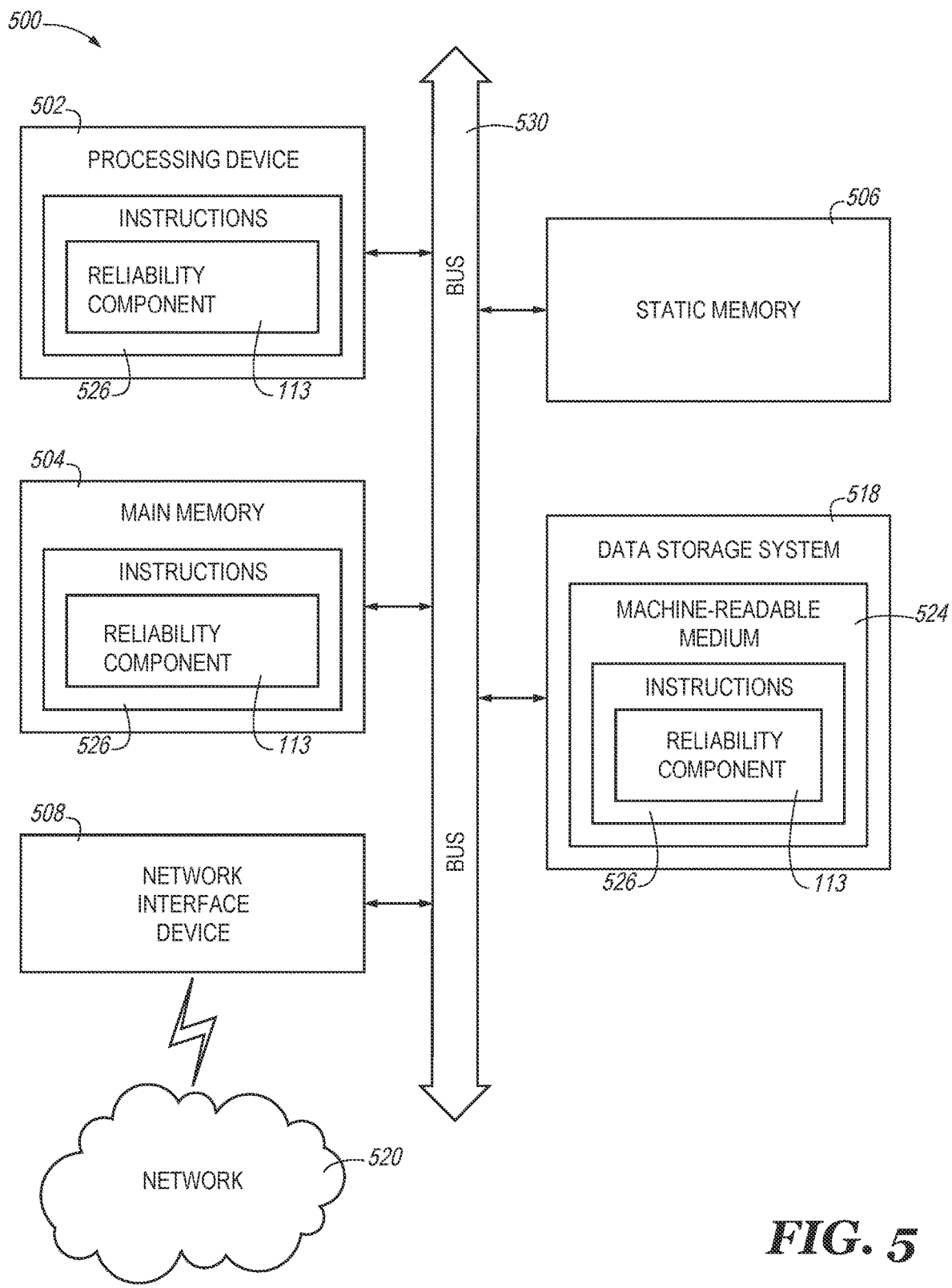
FIG. 5 is a block diagram of an example computer system in which embodiments of the disclosure may operate.

FIG. 5 is a block diagram of an example computer system 500 in which embodiments of the disclosure may operate. For example, FIG. 5 illustrates an example machine of a computer system 500 within which a set of instructions, for causing the machine to perform any one or more of the methodologies discussed herein, can be executed. In some embodiments, the computer system 500 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the reliability based data verification component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage system 518, which communicate with each other via a bus 530.

The processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 508 to communicate over the network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory sub-system 110 of FIG. 1.

In one embodiment, the instructions 526 include instructions to implement functionality corresponding to a reliability component (e.g., the reliability based data verification component 113 of FIG. 1). While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer).

In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc. In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
configuring non-volatile memory blocks of a non-volatile memory to operate in a first verification mode responsive to an initial operation of the non-volatile memory, wherein the first verification mode is a verification mode that does not employ write verification;
writing data to a first subset and a second subset of the non-volatile memory blocks;
subsequently to writing the data to the first subset and to the second subset, determining a first health characteristic of the first subset of the non-volatile memory blocks and a second health characteristic of the second subset of the non-volatile memory blocks; and
configuring the first subset of the non-volatile memory blocks to operate in a second verification mode responsive to determining that the first health characteristic has reached or exceeded a threshold level, wherein the second verification mode is a verification mode in which write verification is employed.

2. The method of claim 1, further comprising configuring the second subset of the non-volatile memory blocks to remain operating in the first verification mode responsive to determining that the second health characteristic has not reached or exceeded the threshold level.

3. The method of claim 1, wherein the first heath characteristic is a program erase cycle (PEC) count corresponding to the first subset of non-volatile memory blocks.

4. The method of claim 1, further comprising, subsequently to configuring the first subset of non-volatile memory blocks to operate in the second verification mode, writing additional data to the first subset of non-volatile memory blocks.

5. The method of claim 4, further comprising performing write verification of the additional data.

6. The method of claim 1, wherein the method further comprises designating the first subset and the second subset with respective reliability designations is based on initial reliability testing of the non-volatile memory blocks of the non-volatile memory.

7. An apparatus, comprising:
a non-volatile memory comprising non-volatile memory blocks; and
a controller configured to:
configure subsets of non-volatile memory blocks of the non-volatile memory in a first verification mode prior to a performance of a write operation and responsive to an initial operation of the non-volatile memory, wherein the first verification mode is a verification mode that does not employ write verification;
write data to the subsets of non-volatile memory blocks configured in the first verification mode in an absence of write verification of the data written to the subsets of non-volatile memory blocks;
responsive to the data being written to the subsets of non-volatile memory blocks, determine a respective health characteristic of a non-volatile memory block in a first subset of the subsets of non-volatile memory blocks meets or exceeds a health threshold, wherein the respective health characteristic is a program erase cycle (PEC) count;
configure the first subset in a second verification mode responsive to determining the first subset meets or exceeds the health threshold, wherein the second verification mode is a verification mode that employs write verification; and
write additional data associated with performance of an additional memory operation to:
the first subset of non-volatile memory blocks configured in the second verification mode with write verification of the data; or
at least one of the remaining subsets of non-volatile memory blocks configured in the first verification mode without write verification of the data, wherein the remaining subsets of non-volatile memory blocks remain configured in the first verification mode until it is determined that the remaining subsets meet or exceed the health threshold.

8. The apparatus of claim 7, wherein the first subset of the non-volatile memory blocks includes at least one word line group of non-volatile memory blocks.

9. The apparatus of claim 7, wherein each subset of non-volatile memory blocks is initially configured to operate in the first verification mode prior to writing any host data to the non-volatile memory.

10. The apparatus of claim 7, wherein a sum of a first quantity of non-volatile memory blocks included in the first subset of non-volatile memory blocks and a second quantity of non-volatile memory blocks included in other subsets of non-volatile memory blocks is equal to a total block count of non-volatile memory blocks included in the non-volatile memory.

11. The apparatus of claim 7, wherein the controller is further configured to:
- compare a respective reliability characteristic associated with each non-volatile memory block in subsets of non-volatile memory blocks to a reliability threshold, wherein the reliability characteristic is based on a raw bit error rate (RBER);
- determine a respective reliability characteristic associated with each non-volatile memory block in the first subset meets or exceeds the reliability threshold; and
- determine a respective reliability characteristic associated with at least one non-volatile memory block in other subsets is below the reliability threshold.

12. A system comprising:
- a memory sub-system comprising a non-volatile memory including non-volatile memory blocks; and
- a processing device resident on the memory sub-system, wherein the processing device is configured to:
  - configure the non-volatile memory blocks to operate in a first verification mode responsive to an initial operation of the memory sub-system, wherein the first verification mode is a verification mode that does not employ write verification;
  - determine respective reliability characteristics associated with subsets of non-volatile memory blocks, wherein the respective reliability characteristics are based on a raw bit error rate (RBER) of the subsets of non-volatile memory blocks;
  - determine a first subset of the non-volatile memory blocks meets or exceeds a reliability threshold and remaining subsets of non-volatile memory blocks are below the reliability threshold;
  - designate the first subset with a first reliability designation and the remaining subsets with a second reliability designation;
  - write data associated with performance of a memory operation to the first subset configured in the first verification mode;
  - determine a respective program erase cycle (PEC) count of at least one non-volatile memory block in the first subset meets or exceeds a health threshold;
  - configure the first subset to operate in a second verification mode responsive to determining the first subset meets or exceeds the health threshold, wherein the second verification mode is a verification mode that employs write verification; and
  - write additional data associated with performance of an additional memory operation to:
    - the first subset configured in the second verification mode with write verification of the data; or
    - at least one subset of the remaining subsets configured in the first verification mode in an absence of write verification of the data; and
  - wherein the at least one subset of the remaining subsets remains configured in the first verification mode until it is determined that the at least one subset meets or exceeds the health threshold.

13. The system of claim 12, wherein the non-volatile memory is comprised of single level memory cells.

14. The system of claim 12, wherein the processing device is further configured to:
- determine the respective PEC count of each non-volatile memory block in the first subset, responsive to the data being written to the first subset; and
- determine a respective PEC count of at least one non-volatile memory block of the first subset is equal to or greater than the health threshold.

15. The system of claim 12, wherein each subset corresponds to a respective word line group in the non-volatile memory.

* * * * *